Patented Dec. 8, 1931

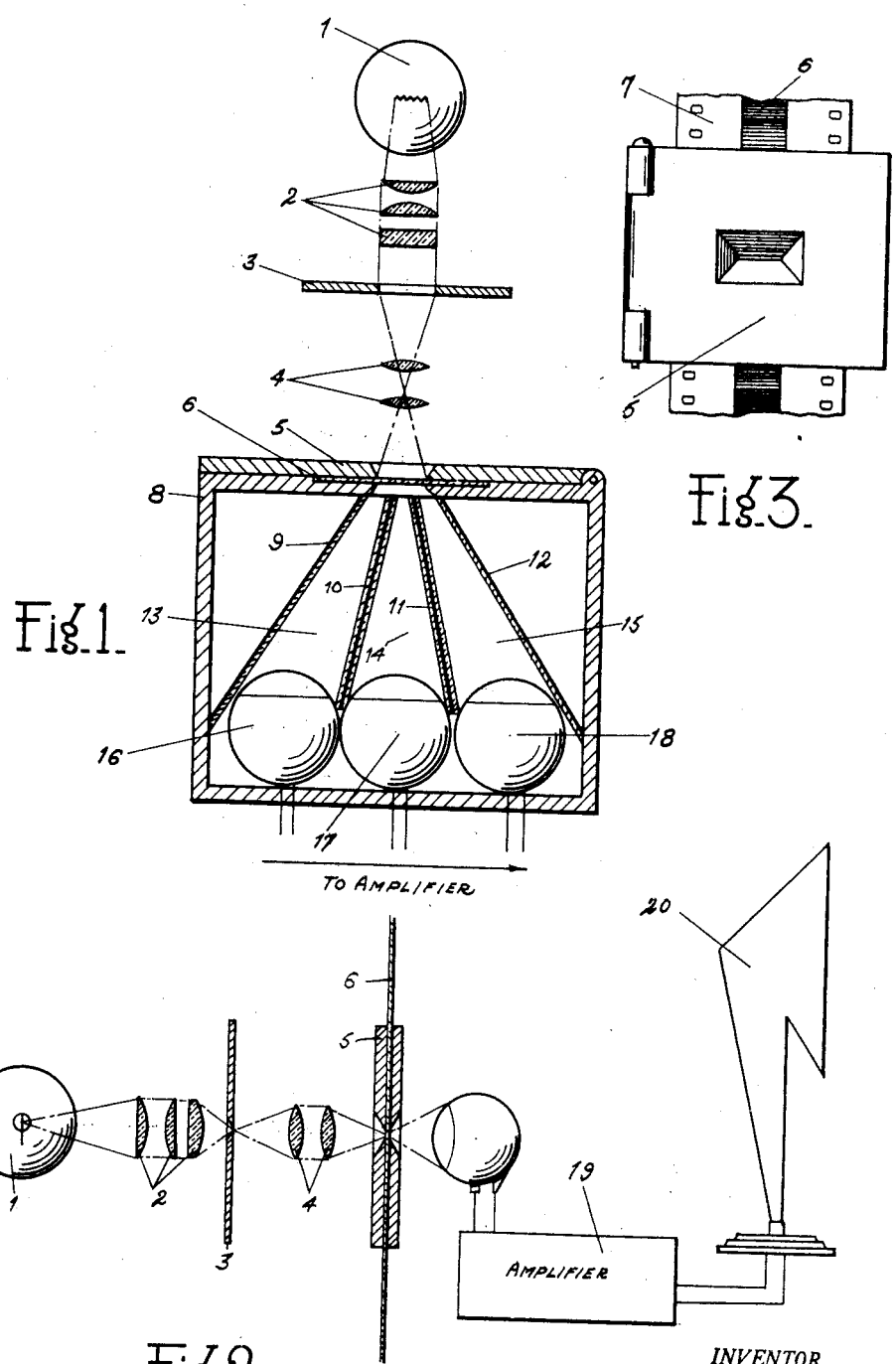

1,835,423

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

MULTIPLE CELL REPRODUCING APPARATUS

Application filed April 1, 1929. Serial No. 351,747.

This invention relates to improvements in multiple cell reproducing apparatus, the object of the invention being to provide a sound-reproducing apparatus in which a plurality of light-sensitive elements are grouped about the path of the modulated light rays in such manner as to affect all of said elements thereby increasing the volume of the reproduced sound over that produced by the use of a single cell.

A further object of the invention is the provision of an apparatus of the character described in which the operation is not dependent upon a single light-sensitive element, but in which a plurality of such elements are disposed in such relation to the path of the modulated light rays that in case of the failure of one or more of said elements to function the remaining elements will catch enough of said rays to prevent interruption of the operation of the apparatus.

With the foregoing and other objects in view, which will appear as the description proceeds, the invention consists in the novel features of construction and combination of parts which will appear more fully hereafter.

In the drawings accompanying and forming part of this specification,

Fig. 1 is a diagrammatic sectional plan view of an apparatus embodying the features of the present invention;

Fig. 2 is a diagrammatic sectional side view, showing the apparatus connected with an amplifier and loud speaker, the housing of the light-sensitive elements being omitted; and Fig. 3 is a fragmentary plan view of the record-carrying film, on an enlarged scale, and showing the film gate with its slit in position to permit passage of light through the record.

The same characters of reference designate the same parts in the different figures of the drawings.

Referring to the drawings, 1 designates a light source, from which the rays pass through condenser lenses 2 and through a slit formed in a suitable partition or screen 3. In the path of projection of the rays of light after their passage through the said slit is a focussing lens 4, by means of which said rays are focussed through a slit in the "gate" 5 upon a sound record 6 which has been photographed on a film, said film being adapted to travel past said slit in the usual manner. In the present instance the film and its gate are shown mounted at one side of a box or housing 8 which is closed so as to exclude all light except that which passes through the record carried by the film.

In the present instance, the interior of the housing is divided by a plurality of divergent partitions 9, 10, 11 and 12 respectively, so disposed that the converging ends of the outermost partitions 9 and 12 will confine between them all of the rays of modulated light that pass into the housing through the record 6, while the partitions 10 and 11 are so disposed between the partitions 9 and 12 as to split said light rays and cause them to travel through a plurality of diverging channels 13, 14 and 15. At the wider ends of the said channels are located light-sensitive elements such as photo-electric cells 16, 17 and 18 respectively, each of said cells having its window of transparent portion so positioned as to catch the rays of light passing through one of said channels, the cells being, as usual, suitably connected to an amplifier 19 and loud speaker 20. In order to insure the reception of a maximum amount of the rays of light by each of the photo-electric cells, the surfaces of the partitions 9, 10, 11 and 12 forming the side walls of the channels 13, 14 and 15 are preferably reflecting surfaces or mirrors, as indicated in Fig. 1, said mirrors serving to reflect the modulated light rays entering between them back and forth until the rays within each channel are received by the proper photo-electric cell, whereby none of the light rays projected into the housing can escape before reaching the cells.

From the foregoing it will be seen that because of the provision of a plurality of light-sensitive elements and their disposition relatively to the path of the modulated light rays, not only is the volume of the reproduced sound greatly increased during normal operation of the apparatus, but in case of the functional failure of one or more of the elements, the remaining elements will catch enough of the light rays to permit the apparatus to "carry on" without appreciable interruption.

While I have described in detail the special arrangement of the mirrored partitions and photo-electric cells herein illustrated, it is to be understood that my invention is not limited to this precise arrangement, as I am aware that many modifications may be made therein without departing from the spirit and scope of the appended claims.

Having thus described my invention, what I claim is:

1. A sound-reproducing apparatus, comprising, in combination, light-projecting means, a closed housing having a narrow opening disposed in the path of light projection, a photographic sound-record adapted to travel past said opening thereby to admit light to said housing only through said record, means within said housing for directing the admitted light rays through diverging paths, a light-sensitive element disposed in each of said paths and positioned so as to receive the rays of light therefrom and translate them into electric impulses, and means common to all of said elements for amplifying and rendering audible the translated impulses.

2. A sound-reproducing apparatus, comprising, in combination, light-projecting means, a closed housing having a narrow opening disposed in the path of light projection, a photographic sound-record adapted to travel past said opening thereby to admit light to said housing only through said record, partitions having reflecting surfaces disposed within said housing in position to confine between them all of the admitted light rays and form diverging channels for the passage of said rays, and a light-sensitive element disposed in each of said channels in position to receive the light rays therefrom and translate them into electric impulses.

3. A sound-reproducing apparatus, comprising, in combination, light-projecting means, a closed housing having a narrow opening disposed in the path of light projection, a photographic sound-record adapted to travel past said opening thereby to admit light to said housing only through said record, partitions having reflecting surfaces disposed within said housing in position to confine between them all of the admitted light rays and form diverging channels for the passage of said rays, a light-sensitive element disposed in each of said channels in position to receive the light rays therefrom and translate them into electric impulses, and means common to all of said elements for amplifying and rendering audible the translated impulses.

In testimony whereof, I affix my signature.

FREEMAN H. OWENS.